United States Patent

Suh

[11] Patent Number: 5,831,591
[45] Date of Patent: Nov. 3, 1998

[54] INFORMATION PICTURE DISPLAY DEVICE USING A DOUBLE-PICTURE TYPE SCREEN

[75] Inventor: Moon-hwan Suh, Seoul, Rep. of Korea

[73] Assignee: Samsung Electronics Co., Ltd., Kyungki-Do, Rep. of Korea

[21] Appl. No.: 680,838

[22] Filed: Sep. 26, 1996

[30]  Foreign Application Priority Data

Sep. 1, 1996 [KR] Rep. of Korea ...................... 95-28889
Sep. 1, 1996 [KR] Rep. of Korea ...................... 95-28890

[51] Int. Cl.$^6$ ...................................................... G09G 5/00
[52] U.S. Cl. .............................. 345/115; 345/1; 345/116; 348/563; 348/564; 348/565; 348/584; 348/588; 348/596
[58] Field of Search ................................ 345/1, 156, 903, 345/115, 116; 348/563, 564, 565, 584, 588, 585, 596, 468

[56]  References Cited

U.S. PATENT DOCUMENTS

| | | | |
|---|---|---|---|
| 5,365,278 | 11/1994 | Willis | 348/588 X |
| 5,442,406 | 8/1995 | Altmanshofer et al. | 348/588 |
| 5,453,796 | 9/1995 | Duffield et al. | 348/565 |
| 5,512,954 | 4/1996 | Shintani | 348/468 |
| 5,557,338 | 9/1996 | Maze et al. | 348/565 |
| 5,576,769 | 11/1996 | Lendaro | 348/564 X |
| 5,657,092 | 8/1997 | Kim | 348/565 |

*Primary Examiner*—Steven J. Saras
*Assistant Examiner*—Seth D. Vail
*Attorney, Agent, or Firm*—Sughrue, Mion, Zinn, Macpeak & Seas, PLLC

[57]  ABSTRACT

In an information picture display device using a double-picture type screen, a TV microcomputer controls a double window processing unit, an information processing unit processes information data received from a value added network and recognizes a selected screen mode to then output a switching control signal. The device is constructed so that the output of a switching unit for selecting one of a sub-video signal and a signal processed in the information processing unit is input to the double window processing unit, thereby displaying an information signal on the entire double-picture type screen, displaying the information signal and a TV signal separately on partitions of the double-picture type screens, or displaying the information signal superimposed on the TV signal. When the information signal is displayed on the entire screen, the signal processed in the information processing unit is displayed directly without passing through the double window processing unit, thereby improving picture quality.

13 Claims, 4 Drawing Sheets

INFORMATION PICTURE DISPLAY DEVICE USING A DOUBLE-PICTURE TYPE SCREEN

BACKGROUND OF THE INVENTION

The present invention relates to an information picture display device using a double-picture type screen, and more particularly, to a display device for displaying an information picture in various configurations using a double-picture type screen of a double window television incorporating a communication function for connecting to a value added network or VAN.

In general, a double window television having a screen ratio of 16 to 9 provides a horizontally elongated screen by having an extended horizontal screen dimension compared to that of existing TV systems. The screen of a double window television can be divided vertically into two halves using a double window scanning method. Then each partitioned screen displays a picture having a screen ratio of 4 to 3, which is the screen ratio of existing TV systems. Thus, picture signals having the same screen ratio for two different TV signals can be displayed on a single screen.

An intelligence TV allows the use of a communication service by connecting the TV to a value added network or VAN. The intelligence TV includes an information processing unit for receiving communication information data (hereinafter referred to as "information data") when connected to the VAN and for outputting information RGB signals, and a switching control signal for displaying the received data. The intelligence TV selects one of the information RGB signal processed by the information processing unit and the TV RGB signal processed by the TV signal processor in accordance with the switching control signal output from the information processing unit and displays the selected signals on a screen.

In the above intelligence TV, various kinds of communication services transmitted via the VAN, such as stock market quotes, news, weather or TV information, can be viewed on the TV screen. The intelligence TV is simple to use so that even persons inexperienced in computer technology can use the communication service.

However, since only the communication information can be displayed on the TV screen while using the communications service, TV broadcasts cannot be monitored.

SUMMARY OF THE INVENTION

It is an object of the present invention to provide a device for selecting and displaying a TV signal and an information signal in various configurations using a double-picture type screen by incorporating a communication function for connecting a VAN into a double window TV.

To accomplish the above object, there is provided a display device for displaying first and second video signals on a double-picture type screen, comprising a double window processing unit for processing first and second video signals to display on the double-picture type screen; a TV microcomputer for controlling the operation of the double window processing unit according to a selected screen mode; an information processing unit for connecting the double-picture type screen to a value added network, for decoding information data received therefrom to output an information video signal, and for identifying the selected screen mode to output a switching control signal; a switching device for selecting one of the second video signal and the information video signal according to the switching control signal to output the selected signal to the double window processing unit; and a display controller for controlling the signal processed by the double window processing unit to be displayed on the CRT.

Also, according to another aspect of the present invention, there is provided a display device for displaying first and second video signals on a double-picture type screen, comprising a double window processing unit for processing first and second video signals to then be displayed on the double-picture type screen; a TV microcomputer for controlling the operation of the double window processing unit depending on a selected screen mode; an information processing unit for decoding information data received from a connection to a value added network, for outputting an information chrominance signal and horizontal and vertical sync signals, and for identifying the selected screen mode to output a plurality of switching control signals; an encoder for encoding the information chrominance signal into the horizontal and vertical sync signals to output an information video signal; a first switching device for selecting one of the second video signal and the information video signal in accordance with the switching control signal to output the selected signal to the double window processing unit; a second switching device for selecting the output signal of the information processing unit in an information mode displaying the information signal on the entire screen and selecting the signal processed by the double window processing unit in other modes in accordance with the switching control signal to then output the selected signal to the CRT; and a display controller for controlling the signal selected by the second switching means to be displayed on the CRT.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

Figure 1:
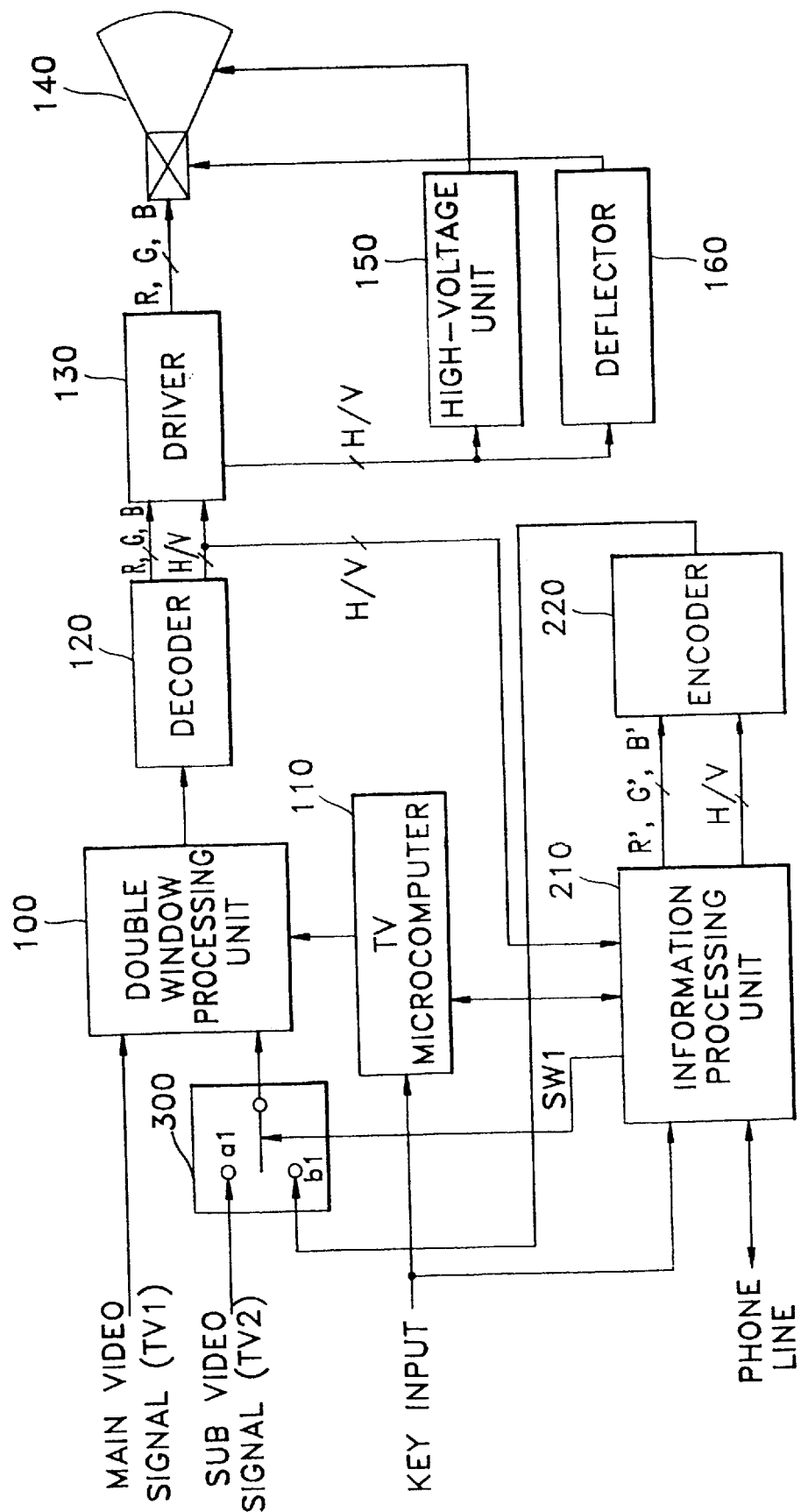
FIG. 1 is a block diagram showing the functional relationship of the components of a display device according to an embodiment of the present invention.

In FIG. 1, a display device according to an embodiment of the present invention includes: a double window processing unit 100 for displaying a main video signal and a sub-video signal simultaneously using a double-picture type screen; a TV microcomputer 110 for recognizing a key input to control the double window processing unit 100 and for receiving and transmitting data in series with an information processing unit 210; a decoder 120 for decoding the signal output from the double window processing unit 100 to output an RGB signal and horizontal/vertical sync signals; a driver 130 for displaying on a CRT 140 the RGB signal output from the decoder 120 in synchronization with the horizontal/vertical sync signals output from the decoder 120; a high-voltage unit 150 for supplying a high voltage to the CRT 140 in accordance with the horizontal/vertical sync signals output from the decoder 120; a deflector 160 for supplying to the CRT 140 a deflecting current signal for correcting convergence in accordance with the horizontal/vertical sync signals output from the decoder 120; an information processing unit 210 for recognizing a key input, connecting to a VAN, receiving and decoding text or graphics information data to then output an information picture RGB signal and horizontal/vertical sync signals, receiving the horizontal/vertical sync signals output from the decoder 120 for synchronization with an external video sync signal and outputting a switching control signal SW1 of a switching element 300; an encoder 220 for encoding the information picture RGB signal and horizontal/vertical sync signals output from the information processing unit 210 to output an information video signal in the form of a composite video signal; and a switching element 300 for receiving sub-video signals by selecting first selection port a1 and for receiving information video signals output from the encoder 220 by selecting port b1.

Figure 2:
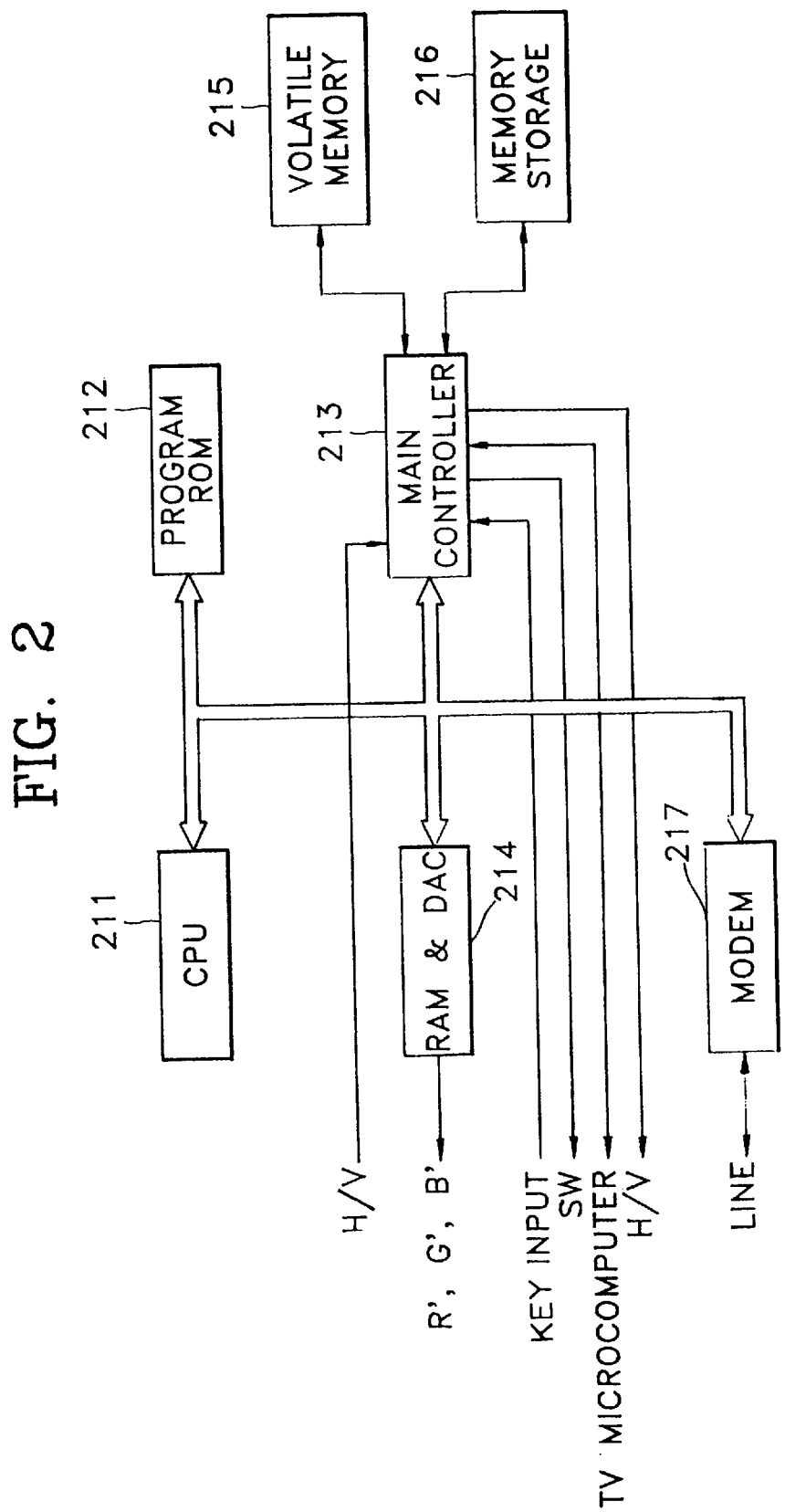
FIG. 2 is a detailed block diagram of the information processing unit 300 shown n FIG. 1.

The information processing unit 210, as shown in FIG. 2, includes: a CPU 211 for controlling the overall system, data transmission and operations of the program stored in a program ROM 212; a program ROM 212 for storing a system control program and various data; a main controller 213 for generating a control signal necessary for the overall system and having an information data reception and display controlling function and graphics data processing function; a RAM & DAC 214 having a palette RAM for converting data processed by the main controller 213 into RGB data and a digital-to-analog converter for converting the RGB data read from the palette RAM into an analog R'G'B' signal; a volatile memory 215 for reading and writing received data under the control of the main controller 213; a storage memory 216 for reading and writing data stored in the volatile memory 215 under the control of the main controller 213; and a modem 217 controlled by the main controller 213 for receiving and transmitting data to and from a host computer via a telephone line (hereinafter, line) under the control of the main controller 213. The modem and line can be replaced by a coaxial cable connected to a cable system.

Figure 3A:
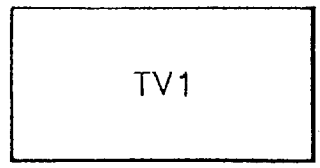
FIGS. 3A through 3E illustrate examples of screens displayed by the display device according to the present invention.
Figure 3B:
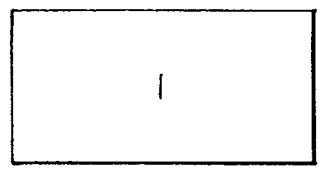
Figure 3C:
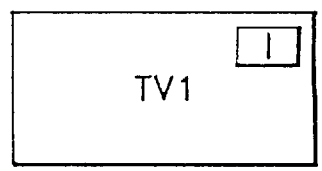
Figure 3D:
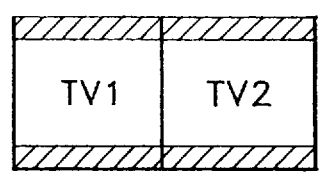
Figure 3E:
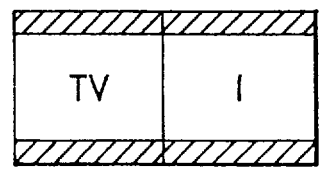

FIGS. 3A through 3E show screen configurations of the present invention. The desired screen mode is selected from a screen selection menu by selecting one of the screen configuration choices. FIG. 3A shows a normal TV mode in which the main video signal is displayed on the entire double-picture type screen. FIG. 3B shows an information mode in which only the information signal is displayed on the entire double-picture type screen. FIG. 3C shows a TV and information mode in which the information signal is displayed by being superimposed on the main video screen. FIG. 3D shows a double TV mode in which the double-picture type screen is vertically divided into two partitions wherein the main video signal is displayed in one partition and the sub-video signal is displayed in the other, and FIG. 3E shows a TV and information mode in which the double-picture type screen is vertically divided into two partitions wherein the main video signal is displayed in one partition and the information signal is displayed in the other.

The operation of the device shown in FIG. 1 will now be described with reference to FIGS. 2 and 3A through 3E.

When a screen mode displaying at least one TV signal is selected, the double window processing unit 100 of FIG. 1, a well-known component, selects one of the main video signal and the sub-video signal received under the control of the TV microcomputer 110 and displays the selected signal or selects both signals according to the configuration selected.

The detailed operation of the information processing unit 210 will be described with reference to FIG. 2. In FIG. 2, the CPU 211 controls the overall system data transmission and operations according to the program stored in the program ROM 212 and the control signal generated in the main controller 213. The data processing for the peripheral functional blocks performed in the CPU 211 is performed by an interrupt signal and the function of transmitting various interrupt signals necessary for the system control is performed in the main controller 213. The interrupt signal is generated by the modem 217 and various tasks of the main controller 213.

The tasks of the main controller 213 are largely performed in the case of infrared data input in accordance with the key input of a transceiver (not shown), a vertical blanking time, operating time of an internal timer for a predetermined function or a serial data input from the TV microcomputer 110. At this time, the main controller 213 generates an interrupt signal for transmission to the CPU 211. The CPU 211 processes the corresponding task whenever the interrupt signal is generated.

The program ROM 212 stores a program necessary for the operation of the system, font data, various kinds of decoding programs and data. The CPU 211 reads data from the program ROM 212 to execute a series of operations therefor. In other words, by a communication mode key input, the main controller 213 recognizes the input to transmit an interrupt signal to the CPU 211 and then the CPU 211 performs the communication to the VAN according to the program stored in program ROM 212.

The data for the telephone number according to the key input is recognized by the main controller 213 to then be transmitted to the CPU 211. The CPU 211 transmits the telephone number to the modem 217. Then, the information processing unit 210 is connected to the VAN via modem 217.

Once the line is connected, a communication command is again input. If the data corresponding to the communication command is transmitted to the host computer via the modem 217, the host computer transmits information data according to the communication command. The transmitted information data received via the modem 217 is demodulated to then be applied to the main controller 213. The main controller 213 stores the data in a predetermined region of the volatile memory 215.

At this time, if the information data is superimposed on the TV signal, the main controller 213 reads the graphics signal for an information picture display which is synchronized with the horizontal and vertical sync signals output from the decoder 120 from the volatile memory 215, to then be applied to the RAM & DAC 214. The RAM & DAC 214 converts the same into an analog RGB signal to then output to the encoder 220 shown in FIG. 1. If the information data is displayed on the entire screen, the horizontal/vertical sync signals generated in a sync signal generator installed in the main controller 213 are output to the encoder 220 and the information data is output to the encoder 220 via the RAM & DAC 214 under the control of the main controller 213.

The main controller 213 recognizes the selected screen mode and generates a switching control signal SW1 to control the switching operation of the switching element 300. Also, the main controller 213 converts parallel data output from the CPU 211 into serial data for interfacing between the CPU 211 and the TV microcomputer 110 to then transmit the same to the TV microcomputer 110, and converts the serial data received from the TV microcomputer 110 into parallel data to then transmit the same to the CPU 211.

The volatile memory 215 and the storage memory 216 which are readable/writable memories store the communication data under the control of the main controller 213. The volatile memory 215 has a data storage region and a video refresh region with the information data being stored in the data storage region. If the double picture type screen is partitioned, the video refresh region corresponds to a 4:3 screen, i.e. FIGS. 3D and 3E, otherwise, the video refresh region corresponds to a 16:9 ratio screen, i.e. FIGS. 3A through 3C.

If the information data is superimposed on the TV signal, the information data is stored in the video refresh region corresponding to the superimposed area and then the stored data is read by the main controller 213 having the graphics processing function to then output the same to the encoder 220 via the RAM & DAC 214.

The modem 217 demodulates a signal received through the line, decodes the demodulated signal for error correction, and stores the data in an internal buffer. The modem 217 generates an interrupt signal to the CPU 211 to then store the received data in the volatile memory 215. Also, the modem 217 receives the digital data to be transmitted from the CPU 211 and demodulates and transmits the same to the host computer.

The R'G'B' signal and horizontal/vertical sync signals output from the information processing unit 210 shown in FIG. 1 are encoded into a composite video signal in the encoder 220 to then be applied to the switching element 300. The switching element 300 selects a sub-video signal TV2 or an information video signal of the encoder 220 in accordance with the switching control signal SW1 generated in the information processing unit 210 to then output the selected signal to the double window processing unit 100.

The high-voltage unit 150 and the deflector 160 receive the horizontal/vertical sync signals output from the decoder 120 via the driver 130 and supply high voltage and deflecting current signals to the CRT 140.

Displaying the information signal directly on the double-picture type screen causes a distortion in the picture which cannot be displayed at normal size since the information signal is horizontally elongated. To prevent such distortions, the deflection signal and the vertical blanking signal may be variably processed.

By a screen selection key input, the TV microcomputer 110 controls the double window processing unit 100. The information processing unit 210 controls the switching element 300, thereby displaying TV and information signals in various configurations as described below.

(1) In the case of the main video signal TV1 being displayed on the entire double-picture type screen, as shown in FIG. 3A, the TV microcomputer 110 supplies the double window processing unit 100 which selects the main video signal TV1 only. At this time, the information processing unit 210 does not output a switching control signal SW1 to the switching element 300. The double window processing unit 100 processes the main video signal TV1 as a double-picture type screen. Then, the processed signal is applied in the form of an RGB signal from the decoder 120 via the driver 130 to the CRT 140, thereby displaying only the main video signal TV1 on the entire double-picture type screen.

(2) In the case of the information signal being displayed on the entire double-picture type screen, as shown in FIG. 3B, the information processing unit 210 outputs a switching control signal SW1 so that the switching element 300 selects the information video signal output from the encoder 220 through its selection port b1. The TV microcomputer 110 outputs a control command to the double window processing unit 100 to display the information signal on the double-picture type screen. Then, the information video signal output from the encoder 220 is applied to the CRT 140 via the double window processing unit 100, decoder 120 and driver 130, thereby displaying only the information signal on the entire double-picture type screen.

(3) In the case of the information signal being superimposed on the TV signal, as shown in FIG. 3C, the information processing unit 210 outputs a switching control signal SW1 so that the switching element 300 selects the output signal of the encoder 220 only for the superimposed area. In order to superimpose the information signal on a predetermined area of the double-picture type screen, the TV microcomputer 110 outputs a control command to the double window processing unit 100. Then, the double window processing unit 100 processes the main video signal TV1 or the sub-video signal TV2 as an extended screen luminance/chrominance signal. The processed signal is supplied from the decoder 120 in the form of an RGB signal to the CRT 140 via the driver 130, thereby displaying a TV signal with the information video signal output from the encoder 220, superimposed in a predetermined area.

(4) In the case of the main video signal and the sub-video signal being displayed, respectively, on partitions of the double-picture type screen, as shown in FIG. 3D, the information processing unit 210 outputs a switching control signal SW1 so that the switching element 300 selects the sub-video signal TV2 through its selection port a1. The TV microcomputer 110 outputs a control command for the main video signal TV1 and the sub-video signal TV2 to be displayed on the partitions. Then, the main video signal TV1 and the sub-video signal TV2 are processed by the double window processing unit 100, and then displayed on the CRT 140 via the decoder 120 and driver 130. Since the main video signal TV1 and the sub-video signal TV2 both have a screen ratio that is substantially 4:3 which must be displayed on a screen having a ratio of 16:9, the upper and lower portions of the CRT 140 are blanked-out, thereby producing unscanned portions.

(5) In the case of the main video signal and the information signal being displayed, respectively, on partitions of the double-picture type screen, as shown in FIG. 3E, the information processing unit 210 outputs a switching control signal SW1 so that the switching element 300 selects the output signal of the encoder 220. The TV microcomputer 110 outputs the control command to the double window processing unit 100 so that the main video signal TV1 and information signal are displayed on the double-picture type screen. Then, the main video signal TV1 and the information signal are processed in the double window processing unit 100, and then sent to the CRT 140 through the decoder 120 and driver 130. The upper and lower portions of the 16:9 screen are blanked-out, thereby producing unscanned portions for the same reasons described in (4).

Figure 4:
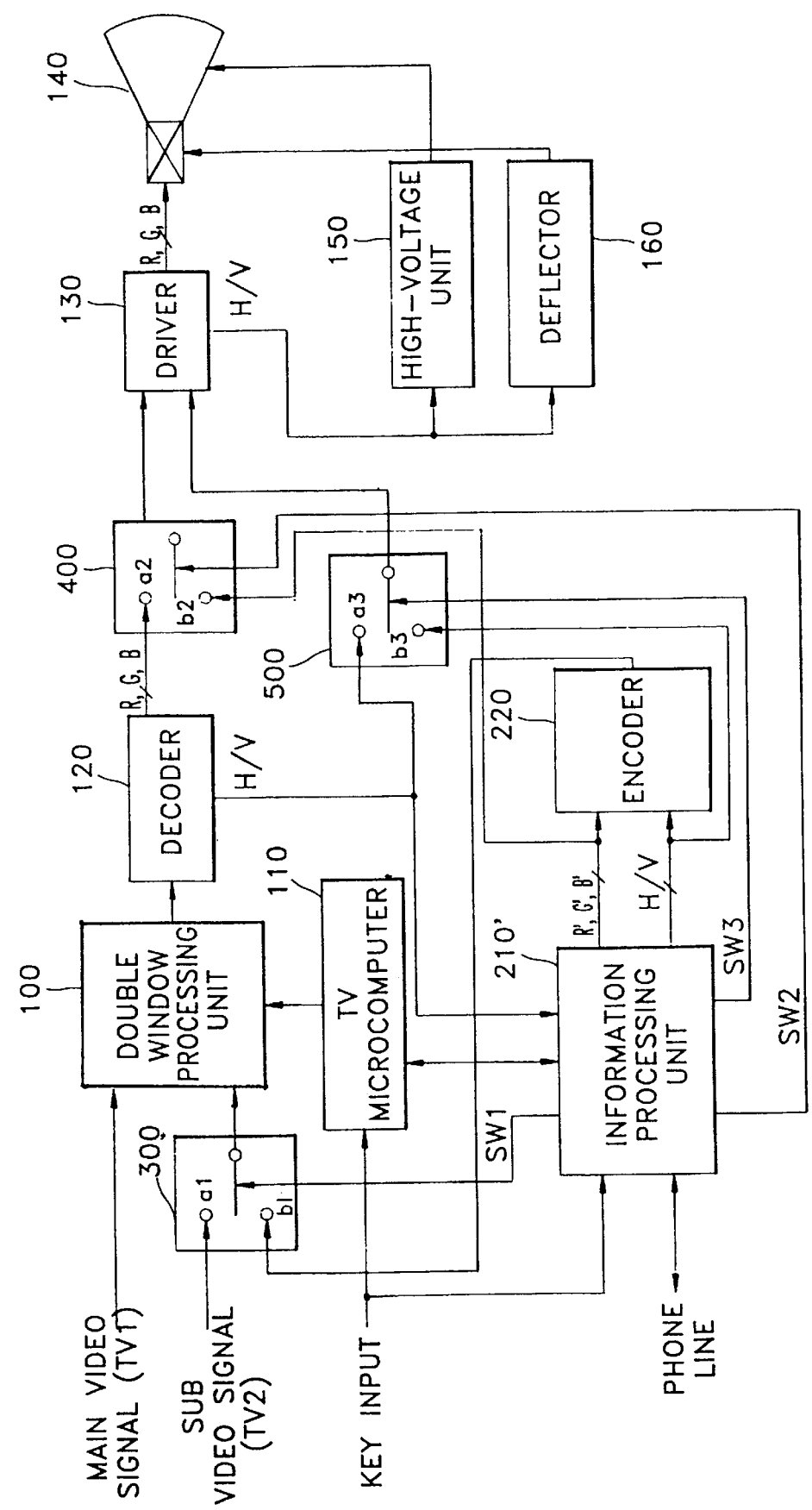
FIG. 4 is a block diagram showing the functional relationship of a display device according to another embodiment of the present invention.

FIG. 4 is a circuit diagram of a display device according to another embodiment of the present invention, in which those parts which are the same as those in FIG. 1 are designated by the same reference numerals, and their detailed description will be omitted.

The display device shown in FIG. 4 is the same as that of FIG. 1 except that there is further provided a second switching element 400 for receiving the double-picture type screen signal output from the decoder 120 via a first selection port a2 and the information picture R'G'B' signal output from the information processing unit 210' via a second selection port b2. The input signal is switched according to a second switching control signal SW2 to output the switched signal to the driver 130. A third switching element 500 is provided which receives the horizontal/vertical sync signals (H/V) output from the decoder 120 via a first selection port a3 and the horizontal/vertical sync signals (H/V) output from the information processing unit 210' via a second selection port b3. The input signal is switched in the third switching element according to a third switching control signal SW3 to output the switched signal to the driver 130. The information processing unit 210' recognizes the user's selected screen selection mode to output first through third switching control signals SW1–SW3. Also, the detailed construction of the information processing unit 210' is the same as that shown in FIG. 2 except that the first through third switching control signals SW1–SW3 are output from a main controller 213.

The operation of the device shown in FIG. 4 will be described with reference to FIGS. 3A through 3E in view of the first through third switching elements 300–500.

In FIG. 4, the information processing unit 210' recognizes the user's selected screen selection key and outputs the first through third switching control signals SW1–SW3 to the first through third switching elements 300, 400, and 500, respectively so that a desired picture is displayed.

The encoder 220 encodes the information R'G'B' signal output from the information processing unit 210' with the horizontal/vertical sync signals (H/V) to then output the information video signal in the form of a composite video signal to the second selection port b1 of the first switching element 300, outputs the information R'G'B' signal to the second selection port b2 of the second switching element 400, and outputs the horizontal and vertical sync signals (H/V) to the second selection port b3 of the third switching element 500.

Therefore, the user selects the screen mode for the double-picture type screen and then the information processing unit 210' having recognized the selected screen mode, changes the switching control signals SW1–SW3, thereby allowing versatile information picture processing.

(1') In the case of the main video signal being displayed on the entire double-picture type screen, as shown in FIG. 3A, the information processing unit 210' does not output a switching control signal SW1 to the switching element 300 to disable the operation of the first switching element 300, but rather outputs second and third switching control signals SW2 and SW3 so that the second switching element 400 selects the RGB signal processed in the decoder 120 and the third switching element 500 selects the horizontal and vertical sync signals output from the decoder 120, respectively. Then, only the main video signal is supplied to the double window processing unit 100 and is processed as a double-picture type screen luminance/chrominance signal. Then, the RGB signal output from the decoder 120 is displayed on the CRT 140 via the driver 130, thereby displaying only the main video signal TV1 on the double-picture type screen.

(2') In case of the information signal being displayed on the entire double-picture type screen, as shown in FIG. 3B, the information processing unit 210' does not output a switching control signal SW1 to the switching element 300 to disable the operation of the first switching element 300, but outputs second and third switching control signals SW2 and SW3 so that the second switching element 400 selects the R'G'B' signal output from the information processing unit 210' and the third switching element 500 selects the horizontal and vertical sync signals output from the information processing unit 210', respectively. The TV microcomputer 110 controls the double window processing unit 100 to so that the double window processing unit does not operate.

Then, only the information R'G'B' signal output from the information processing unit 210' is supplied to the CRT 140 via the driver 130, thereby displaying only the information signal on the double-picture type screen.

(3') In case of the information signal being superimposed on the signal, as shown in FIG. 3C, the information processing unit 210' outputs switching control signals SW1, SW2 and SW3 so that the first switching element 300 selects the output signal of the encoder 220 only for the superimposed area, the second switching element 400 selects the RGB signal of the decoder 120 and the third switching element 500 selects the horizontal and vertical sync signals output from the decoder 120. The TV microcomputer 110 outputs the control command to the double window processing unit 100 so that the information signal is superimposed in a predetermined area where the main video signal or sub-video signal is displayed, and then is displayed on the double-picture type screen. Then, the double window processing unit 100 processes the main video signal TV1 as a double-picture type screen luminance/chrominance signal. The processed signal is supplied to the CRT 140 from the decoder 120 in the form of a RGB signal via the driver 130, thereby displaying a TV signal with the information video signal output from the encoder 220, superimposed in a predetermined area.

(4') In the case of the main video signal and the sub-video signal being displayed, respectively, on partitions of the double-picture type screen, as shown in FIG. 3D, the information processing unit 210' outputs switching control signals SW1, SW2 and SW3 so that the first switching element 300 selects the sub-video signal TV2, the second switching element 400 selects the RGB signal of the decoder 120 and the third switching element 500 selects the horizontal and vertical sync signals of the decoder 120. The TV microcomputer 110 outputs a control command so that the double window processing unit 100 operates. Then, the main video signal TV1 and sub-video signal TV2 are processed as a double-picture type screen signal in the double window processing unit 100, respectively, and then are output as an RGB signal via the decoder 120. The output signal of the decoder 120 is supplied to the CRT 140 via the second switching element 400 and driver 130. Here, since the main video signal TV1 and the sub-video signal TV2 both have a screen ratio that is substantially 4:3 which must be displayed on a screen having a ratio of 16:9, the upper and lower portions of the CRT 140 are blanked-out, thereby producing unscanned portions.

(5') In the case of the main video signal and the information signal being displayed, respectively, on partitions of the double-picture type screen, as shown in FIG. 3E, the information processing unit 210' outputs switching control signals SW1, SW2 and SW3 so that the first switching element 300 selects the information signal of the encoder 220, the second switching element 400 selects the RGB signal of the decoder 120 and the third switching element 500 selects the horizontal and vertical sync signals of the decoder 120. The TV microcomputer 110 outputs a control command so that the double window processing unit 100 performs double window processing. Then, the main video signal TV1 and information signal are processed as a double-picture type screen signal in the double window processing unit 100, respectively, and then are output as an RGB signal via the decoder 120. The output signal of the decoder 120 is supplied to the CRT 140 via the second switching element 400 and driver 130. The upper and lower portions of the 16:9 screen are blanked-out, thereby producing unscanned portions for the same reasons described in (4').

According to the display device shown in FIG. 4, compared with that shown in FIG. 1, since the information signal processed in the information processing unit 210' is displayed directly on the CRT 140 via the second switching element 400 (without passing through the double window processing unit 100 and decoder 120), the picture quality is improved.

As described above, according to the present invention, a desired type of picture can be displayed on the double-picture type screen by adding the communication function to a television having a double window function, thereby allowing versatile information pictures to be displayed.

What is claimed is:

1. A display device for displaying video signals on a double-picture type screen, comprising:
   a double window processing unit for processing at least a first video signal to display on said double-picture type screen;
   a TV microcomputer for controlling operation of said double window processing unit according to a selected screen mode;
   information processing means, connected to said TV microcomputer, for connecting a value added network to said display device, for decoding information data received from said value added network, for generating an information video signal, for identifying the selected screen mode and for outputting a switching control signal;
   switching means for selecting one of a second video signal and said information video signal according to said switching control signal to output a selected video signal to said double window processing unit, wherein said double window processing unit receives said first video signal and said selected video signal and outputs a processed video signal; and
   display controlling means for controlling display of said processed video signal output by said double window processing unit on said double-picture type screen.

2. The display device as claimed in claim 1, wherein said information processing means comprises:
   an information processing unit which receives and decodes said information data supplied from said value added network, and which outputs an information RGB signal and horizontal and vertical sync signals; and
   an encoder for encoding said information RGB signal and said horizontal and vertical sync signals to generate said information video signal.

3. The display device as claimed in claim 2, wherein said switching means outputs said information video signal to said double window processing unit in response to said switching control signal, and wherein said TV microcomputer controls said double window processing unit in response to a first selected screen mode to display only said information video signal on said double-picture type screen.

4. The display device as claimed in claim 2, wherein said switching means outputs said information video signal to said double window processing unit in response to said switching control signal, and wherein said TV microcomputer controls said double window processing unit in response to a second selected screen mode wherein said information video signal is superimposed onto a predetermined portion of said first video signal supplied to said double window processing unit.

5. The display device as claimed in claim 2, wherein said information processing unit comprises:
   a CPU;
   a ROM for storing an operation program;
   a main controller;
   a RAM and DAC device for converting data processed by said main controller into RGB data and for converting said RGB data into said information RGB signal;
   a modem for receiving said information data from said value added network; and
   a communication bus connected to said CPU, said ROM, said main controller, said RAM and DAC and said modem.

6. The display device as claimed in claim 1, wherein switching means outputs said information video signal to said double window processing unit in response to said switching control signal, and wherein said TV microcomputer controls said double window processing unit in response to a third selected screen mode wherein said information video signal is displayed on one partition of said double-picture type screen and said first video signal is displayed on a remaining partition of said double-picture type screen.

7. The display device as claimed in claim 1, wherein said display controlling means comprises:
   a decoder for decoding said processed signal output by said double window processing unit and for outputting a RGB signal and horizontal and vertical sync signals;
   a high-voltage unit for supplying a CRT with high voltage in accordance with said horizontal and vertical sync signals; and
   a deflection unit for supplying said CRT with a deflection current signal in accordance with said horizontal and vertical sync signals.

8. A display device for displaying video signals on a double-picture type screen, comprising:
   a double window processing unit for processing at least a first video signal to be displayed on said double-picture type screen;
   a TV microcomputer for controlling operation of said double window processing unit according to a selected screen mode;
   an information processing unit, connected to said TV microcomputer and to a value added network, for decoding information data received from said value added network, for outputting an information chrominance signal and horizontal and vertical sync signals, for identifying the selected screen mode and for outputting a plurality of switching control signals;
   an encoder for encoding said information chrominance signal into said horizontal and vertical sync signals and for generating an information video signal;
   first switching means for selecting one of a second video signal and said information video signal in accordance with a first switching control signal output by said information processing unit to output a selected video signal to said double window processing unit, wherein said double window processing unit receives said first video signal and said selected video signal and outputs a processed video signal;
   second switching means for selecting said information video signal in an information mode wherein only said information video signal is displayed on said double-picture type screen, and for selecting said processed signal output from said double window processing unit during display modes other than said information mode in accordance with a second switching control signal; and display controlling means for controlling display of an output signal selected by said second switching means on said double-picture type screen.

9. The display device as claimed in claim 8, wherein said display controlling means comprises:

a decoder for decoding said processed signal and for outputting a chrominance signal and horizontal and vertical sync signals, said chrominance signal being supplied to said second switching means;

third switching means for selecting said horizontal and vertical sync signals output from said information processing unit in said information mode in accordance with a third switching control signal;

a high-voltage unit for supplying a CRT with high voltage in accordance with selected horizontal and vertical sync signals; and a deflection unit for supplying said CRT with a deflection current signal in accordance with said selected horizontal and vertical sync signals.

10. The display device as claimed in claim 9, wherein during a first selected screen mode detected by said TV microcomputer and said information processing unit, said first switching means outputs said information video signal to said double window processing unit in response to said first switching control signal, and said second switching means outputs said chrominance signal from said decoder in response to said second switching control signal, said double window processing unit further receiving said first video signal, wherein said TV microprocessor controls said double window processing unit in response to said first selected screen mode to superimpose said information video signal onto a predetermined portion of said first video signal.

11. The display device as claimed in claim 9, wherein during a second selected screen mode detected by said TV microcomputer and said information processing unit, said first switching means outputs said information video signal to said double window processing unit in response to said first switching control signal, and said second switching means outputs said chrominance signal from said decoder in response to said second switching control signal, said double window processing unit further receiving said first video signal, wherein said TV microprocessor controls said double window processing unit in response to said second selected screen mode to display said first video signal on one partition of said double-picture type screen and to display said information video signal on a remaining partition of said double-picture type screen.

12. The display device as claimed in claim 8, wherein said information processing unit does not enable said first switching means during said information mode wherein only said information video signal is displayed on said double-picture type screen.

13. The display device as claimed in claim 8, wherein said information processing unit comprises:

a CPU;

a ROM for storing an operation program;

a main controller;

a RAM and DAC device for converting data processed by said main controller into RGB data and for converting said RGB data into said information RGB signal;

a modem for receiving said information data from said value added network; and a communication bus connected to said CPU, said ROM, said main controller, said RAM and DAC and said modem.

* * * * *